United States Patent [19]
Takeuchi

[11] Patent Number: 4,566,316
[45] Date of Patent: Jan. 28, 1986

[54] WASHER TYPE PRESSURE SENSOR

[75] Inventor: Kiyoshi Takeuchi, Yokohama, Japan

[73] Assignee: Nissan Motor Co., Ltd., Yokohama, Japan

[21] Appl. No.: 569,586

[22] Filed: Jan. 10, 1984

[30] Foreign Application Priority Data

Jan. 10, 1983 [JP] Japan ................ 58-1412[U]

[51] Int. Cl. .................. G01L 9/08; G01M 15/00
[52] U.S. Cl. ........................ 73/754; 73/115; 73/761; 73/DIG. 4; 310/338
[58] Field of Search ........... 73/DIG. 4, 862.68, 35, 73/761, 115, 714, 754; 310/328, 329, 338

[56] References Cited

U.S. PATENT DOCUMENTS

| | | |
|---|---|---|
| 3,151,258 | 9/1964 | Sonderegger et al. .......... 310/338 |
| 3,566,163 | 2/1971 | Fischer et al. .................. 310/338 X |
| 3,614,488 | 10/1971 | Sonderegger et al. ......... 310/338 X |
| 4,088,015 | 5/1978 | Wolfer . |
| 4,483,181 | 11/1984 | Maekawa et al. ............. 310/338 X |

Primary Examiner—Charles A. Ruehl
Attorney, Agent, or Firm—Schwartz, Jeffery, Schwaab, Mack, Blumenthal & Evans

[57] ABSTRACT

Disclosed is a washer type pressure sensor suitable for attachment to an opening for inserting an ignition plug of an engine. The sensor is provided with a pair of ring piezoelectric elements opposed to each other through a ring electrode. A first and a second pressure receiving ring plate are disposed on an upper and a lower surface of the piezoelectric elements, respectively. The first pressure receiving plate is provided with a cylindrical protecting portion extending from the inner periphery thereof to protect an inner periphery of the sensor.

7 Claims, 9 Drawing Figures

WASHER TYPE PRESSURE SENSOR

BACKGROUND OF THE INVENTION

The present invention relates to a washer type pressure sensor which is incorporated between portions for detecting the pressure between the portions.

As shown in FIGS. 1 and 2, a conventional washer type pressure sensor 1 is formed by stacking a plurality of plain ring members which comprises pressure receiving plates 3 and 5, piezoelectric elements 7 and 9, and an electrode plate 11. The openings 13 of the ring members are in alignment with each other. The electrode plate 11 has an output terminal 12 extending from a part of the external periphery thereof and is sandwiched between the piezoelectric elements 7 and 9. Each of the pressure recieving plates 3 and 5 is disposed on the outside surface of the piezoelectric elements 7 and 9 in close contact therewith. The inner and outer peripheries of such plurality of plain ring members are molded with insulation adhesives 15 and 17 made of plastic or the like, so that all the plain ring members are integrally formed in a washer-shape, as shown in FIGS. 2, 3 and 4.

The piezoelectric elements 7 and 9 are disposed so that the polarization directions of both the elements are opposed to each other, and the pressure receiving plates 3 and 5 have an different pole from a pole of the electrode plate 11. Accordingly, the insulation adhesives 15 and 17 serve to insulate between the pressure plate 3 and 5 and the electrode plate 11.

As shown in FIG. 5, the prior art pressure sensor 1 described above is often attached to an opening 19 provided at a cylinder head 21 of an internal combustion engine for inserting an ignition plug 23. The sensor 1 is held between a projection 23c of the plug 23 and the cylinder head 21 so that the sensor 1 can detect a change of a force for fastening the ignition plug 23, when the fuel is burned, to determine the pressure in a combustion chamber 25.

However, in the prior art pressure sensor 1, the insulation adhesive 15 molding the inner periphery thereof is made of a synthetic resin material, such as a plastic, which is relatively fragile against a shock. Therefore, when the ignition plug 23 is engaged with the opening 19 to which the pressure sensor is attached, an outside periphery 23a at the tip of the plug 23 or threads 23b may hit against the inner periphery of the pressure sensor 1 and injure the insulation adhesive 9 unless the plug 23 is carefully and exactly inserted. This causes the insulation between the pressure receiving plates 3 and 5 and the electrode plate 11 to be destroyed, and, as a result, an electrical short-circuit between the pressure plates 3 and 5 and the electrode plate 11 appears.

SUMMARY OF THE INVENTION

An object of the invention is to provide a washer type pressure sensor which can structurally enhance an inner periphery of an opening formed therein.

Another object of the invention is to provide a washer type pressure sensor which completely prevents insulation therein from being destroyed.

These and other objects, advantages and features are accomplished by the provision of a washer type pressure sensor having a cylindrical protection portion extending from an inner periphery of one pressure receiving plate to protect the inner periphery of the sensor.

BRIEF DESCRIPTION OF THE DRAWINGS

These and other objects, features and advantages of the present invention will be more apparent from th following description of a preferred embodiment, taken in conjunction with the accompanying drawings, in which.

DETAILED DESCRIPTION OF THE INVENTION

Figure 1:
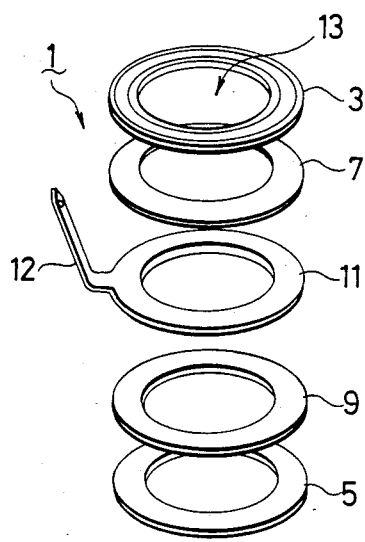
FIG. 1 is an exploded perspective view showing a structure of a conventional washer type pressure sensor.
Figure 2:
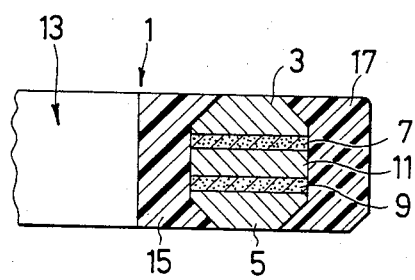
FIG. 2 is a cross-sectional view of the sensor shown in FIG. 1.
Figure 3:
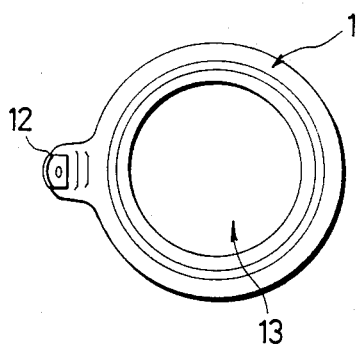
FIG. 3 is a plan view of the sensor shown in FIG. 1.
Figure 4:
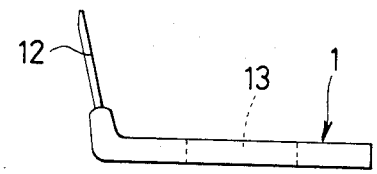
FIG. 4 is a side view of the sensor shown in FIG. 1.
Figure 5:
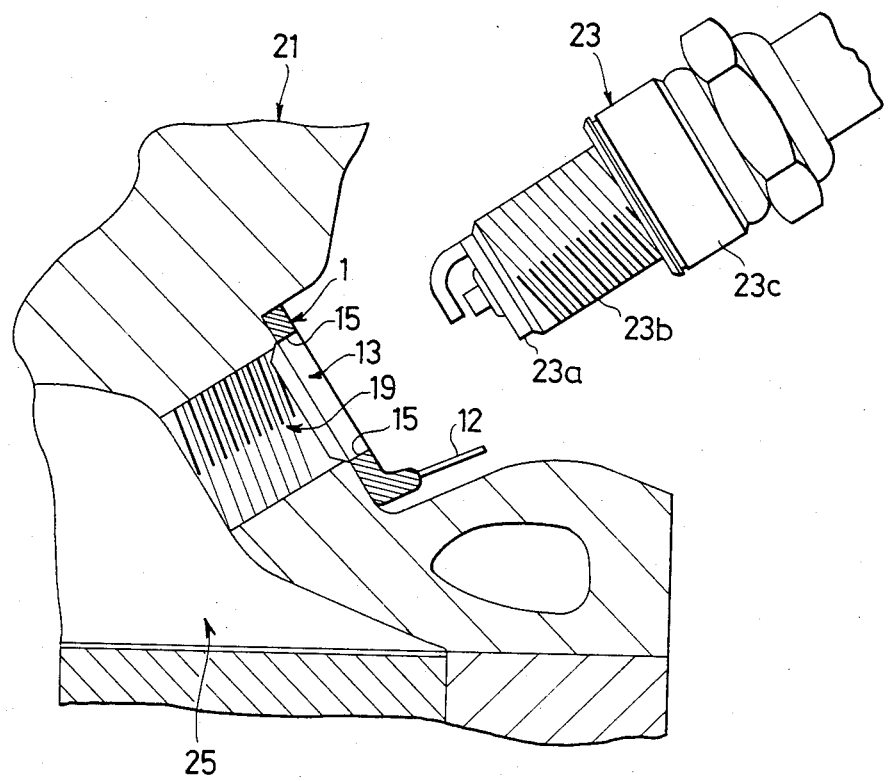
FIG. 5 is a cross-sectional view illustrating an example of using the washer type pressure sensor.
Figure 6:
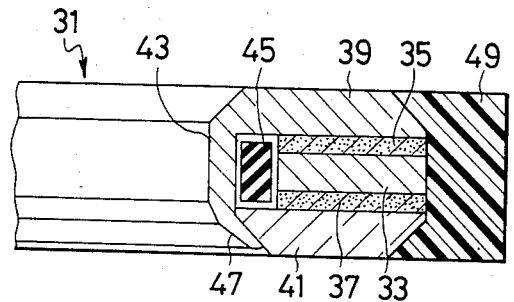
FIG. 6 is a cross-sectional view of a first embodiment of a washer type pressure sensor according to the present invention.

Referring now to FIG. 6, there is shown a washer type pressure sensor 31 embodying the present invention. The washer type pressure sensor 31 comprises an electrode plate 33, a pair of ring piezoelectric elements 35 and 37 disposed in mechanically and electrically close contact with both the surfaces of the electrode plate 33, and a first and second pressure receiving plates 39 and 41 disposed in mechanically and electrically close contact with the piezoelectric elements 35 and 37 so that the first and second pressure receiving plates 39 and 41 are opposed to each other through the piezoelectric elements 35 and 37. The first and second pressure receiving plates 39 and 41 are made of metal. The first pressure receiving plate 39 is integrally formed with a cylindrical protecting portion 43 extending from the inner periphery of the first receiving plate 39 toward the second pressure receiving plate 41. The sensor 31 is further provided with a ring insulator 45 disposed on the external periphery of the cylindrical protecting portion 43. An end portion 47 of the cylindrical protecting portion 43 of the first pressure receiving plate 39 is bent toward the second pressure receiving plate 41 to be caulked on a bevelled inner periphery of the second pressure receiving plate 41 so that the electrode plate 33, the piezoelectric elements 35 and 37, and the insulator 45 are fastened between the first and second pressure receiving plates 39 and 41. Therefore, the ring insulator 45 is fixedly interposed between the protecting portion 43 and the piezoelectric elements 35 and 37. The insulator 45 is made of a soft material such as rubber or the like.

The outside periphery of the sensor 31 is molded with an insulation adhesive 49 made of plastic or the like, as shown in FIG. 6.

As the piezoelectric elements 35 and 37, a piezoelectric ceramic containing, for example, PZT (a trademark) or the like may be employed. The polarization directions of the piezoelectric elements 35 and 37 are opposed to each other so that the electric charges having the same polarity are generated in the contact surfaces between the piezoelectric elements 35 and 37 and the electrode plate 33 in response to the pressure applied to the sensor 31. These charges are delivered from the electrode plate 33 and the pressure receiving plates 39 and 41 to the outside. Insulation between the pressure plates 39 and 41 and the electrode plate 33 is accomplished by the insulator 45, and the outside periphery of the sensor 31 is insulated by the molded insulation adhesive 49.

In the washer type pressure sensor 31 described above, since the inner periphery of the sensor 31 is protected by the metal protecting portion 43 of the first pressure receiving plate 39, the sensor 31 maintains the sufficient strength against a shock. Also, since the protecting portion 43 is integrally formed to the first pressure receiving plate 39, the shock can be distributed to the first pressure receiving plate 39. This means that the structural strength resisting the shock is more enhanced.

Figure 7:
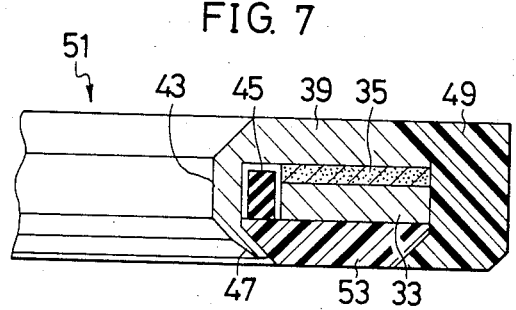
FIG. 7 is a cross-sectional view of a second embodiment of the washer type pressure sensor according to the present invention.

Referring to FIG. 7, a second embodiment of a washer type pressure sensor of the present invention is shown.

The washer type pressure sensor 51 of this embodiment is similar to the first embodiment in the basic construction with the exception that the lower piezoelectric element 37 of the sensor 31 in the first embodiment is omitted and only the upper piezoelectric element 35 is left.

Furthermore, a second pressure receiving plate 53 made of relatively rigid insulator such as ceramics or fiber reinforced plastics is used instead of the metal pressure receiving plate 41 in the first embodiment to insulate between different poles of the piezoelectric element 35. Other constructions are the same as those of the first embodiment.

The washer type pressure sensor 51 described above has effects that constituent elements can be decreased and thus the manufacturing cost can be also reduced, in addition to the same effects as in the first embodiment.

Figure 8:
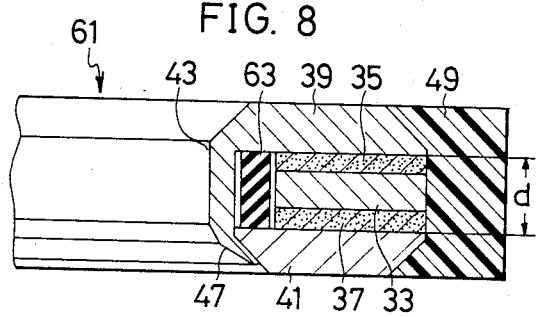
FIG. 8 is a cross-sectional view of a third embodiment of the washer type pressure sensor according to the present invention.

Referring to FIG. 8, a third embodiment of a washer type pressure sensor of the present invention is shown. The pressure sensor 61 of this embodiment is also similar to the first embodiment shown in FIG. 6 with the exception that a ring insulator 63 having a length in the vertical direction which is longer than the length d between the two pressure receiving plates 39 and 41 is interposed between the protection portion 43 and the piezoelectric elements 35 and 37 instead of the insulator 45 used in the pressure sensor 31 of the first embodiment.

In this embodiment, the insulator 63 serves as a watertight packing in that the insulator 63 is elastically in abutment with the opposing surfaces of the first and second pressure receiving plates 39 and 41 when the extending end portion 47 of the protecting portion 43 is caulked to fasten the second pressure receiving plate 41, so that water does not reach the piezoelectric elements inside the insulator 63 even if water enters from the caulked portion.

Figure 9:
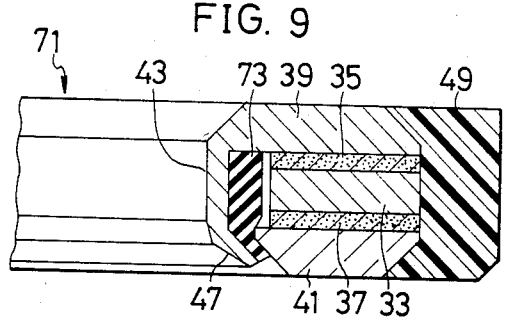
FIG. 9 is a cross-sectional view of a fourth embodiment of the washer type pressure sensor according to the present invention.

Referring to FIG. 9, a fourth embodiment of a washer type pressure sensor of the present invention is shown. In this embodiment, a pressure sensor 71 possesses a watertight effect similar to that of the third embodiment. A ring insulator 73 having a length in the vertical direction which is longer than the length d between the two pressure receiving plates 39 and 41 is interposed between the protection portion 43 and the piezoelectric elements 35 and 37. The lower end of the insulator 73 is further interposed between the bevelled portion of the second pressure receiving plate 41 and the extending end portion 47 of the protecting portion 43 when the extending end 47 is caulked on the bevelled portion of the second pressure receiving plate 41. Therefore, the waterproofing of the caulked portion is enhanced.

Although a preferred embodiment of the invention is specifically illustrated and described herein, it will be appreciated that many modifications and variations of the present invention are possible in light of the above teachings and within the purview of the appended claims without departing from the spirit and intended scope of the invention.

What is claimed is:

1. A washer type pressure sensor for detecting a pressure applied thereto by an ignition plug inserted into the washer-type sensor, comprising:
    at least one ring-shaped piezoelectric element;
    a ring-shaped electrode plate in close contact with said piezoelectric element;
    a first ring-shaped pressure receiving plate adapted to engage an ignition plug;
    a second ring-shaped pressure receiving plate adapted to engage a cylinder head, said piezoelectric element and said electrode plate being positioned between said first and second ring-shaped receiving plates;
    a metallic inner cylindrical protecting portion integrally formed with said first pressure receiving plate and extending from the inner periphery of said first pressure receiving plate to said second pressure receiving plate, saidmetallic protecting portion having a thickness sufficient to protect the inner peripheries of said piezoelectric element and said electrode plate from shock; and
    an outer cylindrical portion comprising a plastic extending from the outer periphery of said first pressure receiving plate to said second pressure receiving plate.

2. A washer type pressure sensor as claimed in claim 1, further comprising a ring insulator which is inserted between said electrode plate and said protecting portion of said first pressure receiving plate for maintaining insulation therebetween, and ring insulator is made of relatively soft material.

3. A washer type pressure sensor as claimed in claim 2, in which said ring insulator has a length in the vertical direction which is longer than the length between said first and second pressure receiving plates.

4. A washer type pressure sensor as claimed in claim 3, in which one end of said ring insulator is rigidly interposed between said second pressure receiving plate and the end portion of the protecting portion.

5. A washer type pressure sensor as claimed in claim 1, in which an end portion of said protecting portion contacts the inner periphery of said second pressure receiving plate.

6. A washer type pressure sensor as claimed in claim 1, in which said second pressure receiving plate comprises a rigid insulator.

7. A washer type pressure sensor which is adapted to detect a pressure subjected thereto, comprising:
    at least one ring-shaped piezoelectric element;
    a ring-shaped electrode plate disposed in close contact with said piezoelectric element;

a first and a second ring-shaped pressure receiving plate adapted to sandwich said piezoelectric element and said electrode plate;

means for protecting inner peripheries of said piezoelectric element and said electrode plate from a shock, wherein said protecting means comprises a cylindrical protecting portion which is integral with said first pressure receiving plate and extends from an inner periphery of said first pressure receiving plate to the inner periphery of said second receiving plate, said protecting portion comprising a metal; and a ring insulator inserted between said electrode plate and said protecting portion of said first pressure receiving plate for maintaining insulation therebetween, said ring insulator comprises a relatively soft material and having a length in the vertical direction longer than the length between said first and second pressure receiving plates, wherein one end of said ring insulator is rigidly interposed between said second pressure receiving plate and the end portion of said protecting portion.

* * * * *